US012566596B2

(12) United States Patent
Feith et al.

(10) Patent No.: US 12,566,596 B2
(45) Date of Patent: Mar. 3, 2026

(54) GRAPH PATH PREDICTION AND MASKED LANGUAGE MODELLING JOINT TRAINING ALGORITHM FOR LANGUAGE MODELS

(71) Applicant: Oracle International Corporation, Redwood Shores, CA (US)

(72) Inventors: Tomas Feith, Zurich (CH); Arno Schneuwly, Effretikon (CH); Saeid Allahdadian, Vancouver (CA); Matteo Casserini, Zurich (CH); Felix Schmidt, Baden-Dattwil (CH)

(73) Assignee: Oracle International Corporation, Redwood Shores, CA (US)

( * ) Notice: Subject to any disclaimer, the term of this patent is extended or adjusted under 35 U.S.C. 154(b) by 147 days.

(21) Appl. No.: 18/235,461

(22) Filed: Aug. 18, 2023

(65) Prior Publication Data

US 2025/0060951 A1 Feb. 20, 2025

(51) Int. Cl.
| | |
|---|---|
| *G06F 8/41* | (2018.01) |
| *G06F 16/901* | (2019.01) |
| *G06N 3/045* | (2023.01) |
| *G06N 3/08* | (2023.01) |

(52) U.S. Cl.
CPC .............. *G06F 8/425* (2013.01); *G06F 8/427* (2013.01); *G06F 16/9024* (2019.01); *G06F 16/9027* (2019.01); *G06N 3/045* (2023.01); *G06N 3/08* (2013.01)

(58) Field of Classification Search
CPC ...... G06F 8/425; G06F 8/427; G06F 16/9024; G06N 3/08; G06N 3/045
See application file for complete search history.

(56) References Cited

U.S. PATENT DOCUMENTS

2022/0198294 A1 6/2022 Schneuwly et al.

FOREIGN PATENT DOCUMENTS

| | | | |
|---|---|---|---|
| CN | 111046630 B | 7/2021 | |
| GB | 2605652 A | * 10/2022 | ........... G06K 9/6257 |

OTHER PUBLICATIONS

Dasgupta, Arpan et al., "Review of extreme multilabel classification", 2023, 47 pages.
Kementchedjhieva, Yova et al., "An exploration of encoder-decoder approaches to multi-label classification for legal and biomedical text", CoRR, abs/2305.05627, 2023, available: https://doi.org/10.48550/arXiv.2305.05627, 14 pages.

(Continued)

*Primary Examiner* — Geoffrey R St Leger
(74) *Attorney, Agent, or Firm* — Hickman Becker Bingham Ledesma LLP

(57) ABSTRACT

In an embodiment providing natural language processing (NLP), a computer generates a histogram that correctly represents a graph that represents a lexical text, and generates a token sequence encoder that is trainable and untrained. During training such as pretraining, the token sequence encoder infers an encoded sequence that incorrectly represents the lexical text, and the encoded sequence is dense and saves space. To increase the accuracy of the sequence encoder by learning, the token sequence encoder is adjusted based on, as discussed herein, an indirectly measured numeric difference between the encoded sequence that incorrectly represents the lexical text and the histogram that correctly represents the graph.

18 Claims, 7 Drawing Sheets

(56)     References Cited

OTHER PUBLICATIONS

Kanade, Aditya et al., "Learning and Evaluating Contextual Embedding of Source Code", Proceedings of the 37th International Conference on Machine Learning, Jul. 13-18, 2020, vol. 119 of Proceedings of Machine Learning Research, pp. 5110-5121.

Jiang, Xue et al., "A tree-based pre-trained model for programming language", Proceedings of the Thirty-Seventh Conference on Uncertainty in Artificial Intelligence, Jul. 27-30, 2021, vol. 161 of Proceedings of Machine Learning Research, pp. 54-63.

Izadi, Maliheh et al., "Codefill: Multi-token code completion by jointly learning from structure and naming sequences", Proceedings of the 44th International Conference on Software Engineering, ICSE '22, New York, NY, USA, 2022, pp. 401-412.

Husain, Hamel et al., "Code—searchnet challenge: Evaluating the state of semantic code search", CoRR, abs/1909.09436, 2019, available: http://arxiv.org/abs/1909.09436, 6 pages.

Guo, Daya et al., "Unixcoder: Unified cross-modal pre-training for code representation", Proceedings of the 60th Annual Meeting of the Association for Computational Linguistic, ACL 2022, May 22-27, 2022, pp. 7212-7225.

Abramovich, Felix et al., "Classification with many classes: Challenges and pluses", J. Multivar, Anal, 174, 2019, available: https://doi.org/10. 1016/j.jmva.2019.104536, 25 pages.

Devlin, Jacob et al., "BERT: Pre-training of Deep Bidirectional Transformers for Language Understanding", Proceedings of The 2019 Conference of the North American Chapter of the Association for Computational Linguistics, Jun. 2-7, 2019, 4171-4186.

Liu, Feng et al., "MLRF: multi-label classification through random forest with label-set partition", Advanced Intelligent Computing Theories and Applications—11th International Conference, Aug. 20-23, 2015, pp. 407-418.

Chowdhery, Aakanksha et al., "Palm: Scaling language modeling with pathways", CoRR, abs/2204.02311, 2022, available: https://doi.org/10.48550/arXiv.2204.02311, 87 pages.

Chen, Mark et al., "Evaluating large language models trained on code", CoRR, abs/2107.03374, 2021, available: https://arxiv.org/abs/2107.03374, 35 pages.

Caruana, Rich, "Multitask Learning", Machine Learning, 28, Jul. 1997, 35 pages.

Brown et al. "Language models are few-shot learner", Advances in Neural Information Processing Systems 33: Annual Conference on Neural Information Processing Systems 2020, NeurIPS 2020, 75 pages.

Ben Allal, Loubna et al., "Santacoder: don't reach for the stars!", CoRR, abs/2301.03988, 2023, available: https://doi.org/10.48550/arXiv.2301.03988, 22 pages.

Alon, Uri et al., "code2vec: learning distributed representations of code", Proc. ACM Program. Lang., 3(POPL):40:1-40:29, 2019.

Alon, Uri et al., "code2seq: Generating sequences from structured representations of code", 7th International Conference on Learning Representations, ICLR 2019, New Orleans, LA, USA, May 6-9, 2019, OpenReview.net, 2019, 22 pages.

Guo, Daya et al., "Graphcodebert: Pre-training code representations with data flow", 9th International Conference on Learning Representations, ICLR 2021, Austria, May 3-7, 2021, available: https://openreview.net/forum?id=jLoC4ez43PZ, 18 pages.

Read, Jesse et al., "Deep learning for multi-label classification", CoRR, abs/1502.05988, 2015, available: http://arxiv.org/abs/1502.05988, 8 pages.

Zhang, Min-Ling et al., "A review on multi-label learning algorithms", IEEE Transactions on Knowledge and Data Engineering, 26(8), 2014, 1819-1837.

Weston, Jason et al., "Label partitioning for sublinear ranking", Proceedings of the 30th International Conference on Machine Learning, vol. 28 of Proceedings of Machine Learning Research, Jun. 17-19, 2013, pp. 181-189.

Wang, Yanlin et al., "Code completion by modeling flattened abstract syntax trees as graphs", Thirty-Fifth AAAI Conference on Artificial Intelligence, AAAI 2021, Feb. 2-9, 2021, pp. 14015-14023.

Wang, Xin et al., "SynCoBERT: Syntax-Guided Multi-Modal Contrastive Pre-Training for Code Representation", 2021, 9 pages.

Wang, Xiao et al., "Heloc: hierarchical contrastive learning of source code representation", Proceedings of the 30th IEEE/ACM International Conference on Program Comprehension, ICPC 2022, Virtual Event, May 16-17, 2022, pp. 354-365.

Vaswani, Ashish et al., "Attention is all you need", Advances in Neural Information Processing Systems 30: Annual Conference on Neural Information Processing Systems 2017, Dec. 4-9, 2017, Long Beach, CA, USA, pp. 5998-6008.

Touvron, Hugo et al., "Llama: Open and efficient foundation language models", CoRR, abs/2302.13971, 2023, available: https://doi.org/10.48550/arXiv.2302.13971, 27 pages.

Kim, Seohyun et al., "Code prediction by feeding trees to transformers", 43rd IEEE/ACM International Conference on Software Engineering, ICSE 2021, Madrid, Spain, May 22-30, 2021, pp. 150-162, available: https://doi.org/10.1109/ICSE43902.2021.00026.

Sultana, Farhana et al., "Advancements in image classification using convolutional neural network", CoRR, abs/1905.03288, 2019, available: http://arxiv.org/abs/1905.03288, 9 pages.

Li, Raymond et al., "Starcoder: may the source be with you!", CoRR, abs/2305.06161, 2023, available: https://doi.org/10.48550/arXiv.2305.06161, 55 pages.

Radford, Alec et al., "Language models are unsupervised multitask learners", OPENAI Blog, 1(8):9, 2019, 24 pages.

Radford, Alec et al., "Improving language understanding by generative pre-training", 2018, 12 pages.

Prabhu, Yashoteja et al., "FastXML: A fast, accurate and stable tree-classifier for extreme multi-label learning", Proceedings of the 20th ACM SIGKDD International Conference on Knowledge Discovery and Data Mining, 2014, p. 263-272.

Peng, Han et al., "Integrating Tree Path in Transformer for Code Representation", Advances in Neural Information Processing Systems, vol. 34, 2021, pp. 9343-9354.

OpenAI, "GPT-4 technical report", CoRR, abs/2303.08774, 2023, available: https://doi.org/10.48550/arXiv.2303.08774, 100 pages.

Liu, Yapeng et al., "Improving code completion by sequence features and structural features", Proceedings of the 4th World Symposium on Software Engineering, WSSE '22, 2022, pp. 51-58.

Zugner, Daniel et al., "Language-Agnostic Representation Learning of Source Code from Structure and Context", 9th International Conference on Learning Representations, ICLR 2021, May 3-7, 2021, available: https://openreview.net/forum?id=Xh5eMZVONGF, 22 pages.

Tang, Ze, et al., "Ast-trans: Code summarization with efficient tree-structured attention", 2022 IEEE/ACM 44th International Conference on Software Engineering (ICSE), 2022, pp. 150-162.

Maduko, "Graph summaries for optimizing graph pattern queries on rdf databases" downloaded Jan. 4, 2024 https://getd.libs.uga.edu/pdfs/maduko_angela_i_200905_phd.pdf 106 pages.

Blume, "Semantic Structural Graph Summaries for Evolving and Distributed Graphs" OPARU, 2 (Nov. 18, 2022), 162 pages.

Zugner, Daniel, et al., "Language-Agnostic Representation Learning of Source Code from Structure and Context", ICLR 2021, https://arxiv.org/abs/2103.11318, Mar. 21, 2021, 22pgs.

Zhang, Jian, et al., "A Novel Neural Source Code Representation Based on Abstract Syntax Tree", 2019 IEEE/ACM 41st ICSE, doi: 10.1109/ICSE.2019.00086, pp. 783-794, May 25, 2019, 12pgs.

Mou et al., "Building Program Vector Representations for Deep Learning", dated Sep. 11, 2014, 11 pages.

Jimenez et al., "On the Impact of Tokenizer and Parameters on N-Gram Based Code Analysis", dated 2018, 12 pages.

Guo, Daya, et al., "UniXcoder: Unified Cross-Modal Pre-training for Code Representation", https://arxiv.org/abs/2203.03850, Mar. 8, 2022, 14pgs.

Devlin, Jacob, et al., "BERT: Pre-training of Deep Bidirectional Transformers for Language Understanding", https://arxiv.org/abs/1810.04805, May 24, 2019, 16pgs.

(56)                    References Cited

OTHER PUBLICATIONS

Cai et al., "An Abstract Syntax Tree Encoding Method for Cross-Project Defect Prediction", IEEE, dated Nov. 15, 2019, 10 pages.
Alon et al., "A General Path-Based Representation for Predicting Program Properties" dated Apr. 22, 2018, 16 pages.
"Tree-sitter", Introduction, https://tree-sitter.github.io/tree-sitter/, last accessed Jun. 9, 2023, 4pgs.

* cited by examiner

FIG. 2

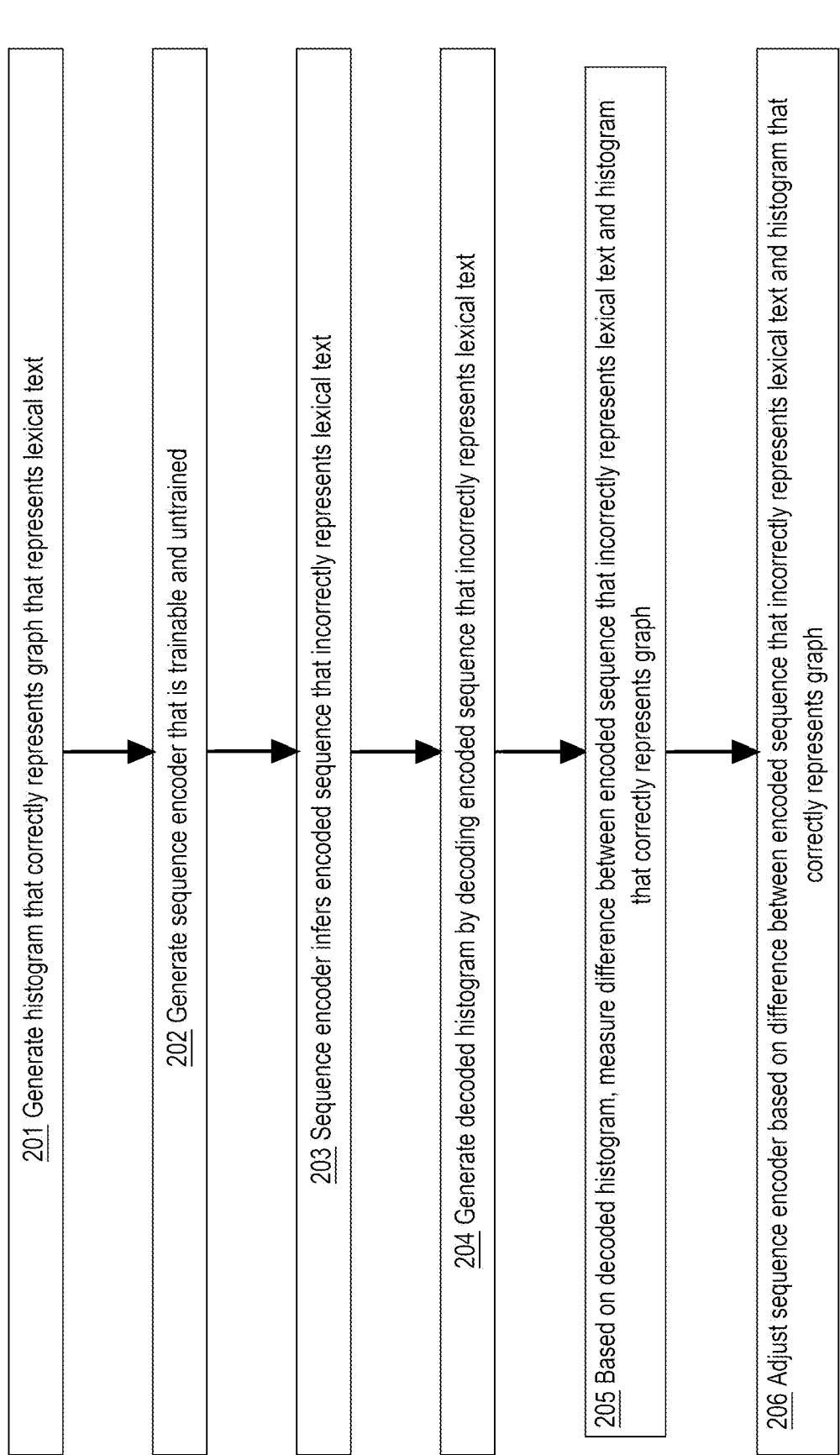

201 Generate histogram that correctly represents graph that represents lexical text 202 Generate sequence encoder that is trainable and untrained 203 Sequence encoder infers encoded sequence that incorrectly represents lexical text 204 Generate decoded histogram by decoding encoded sequence that incorrectly represents lexical text 205 Based on decoded histogram, measure difference between encoded sequence that incorrectly represents lexical text and histogram that correctly represents graph 206 Adjust sequence encoder based on difference between encoded sequence that incorrectly represents lexical text and histogram that correctly represents graph

COMPUTER 300

FIG. 4A

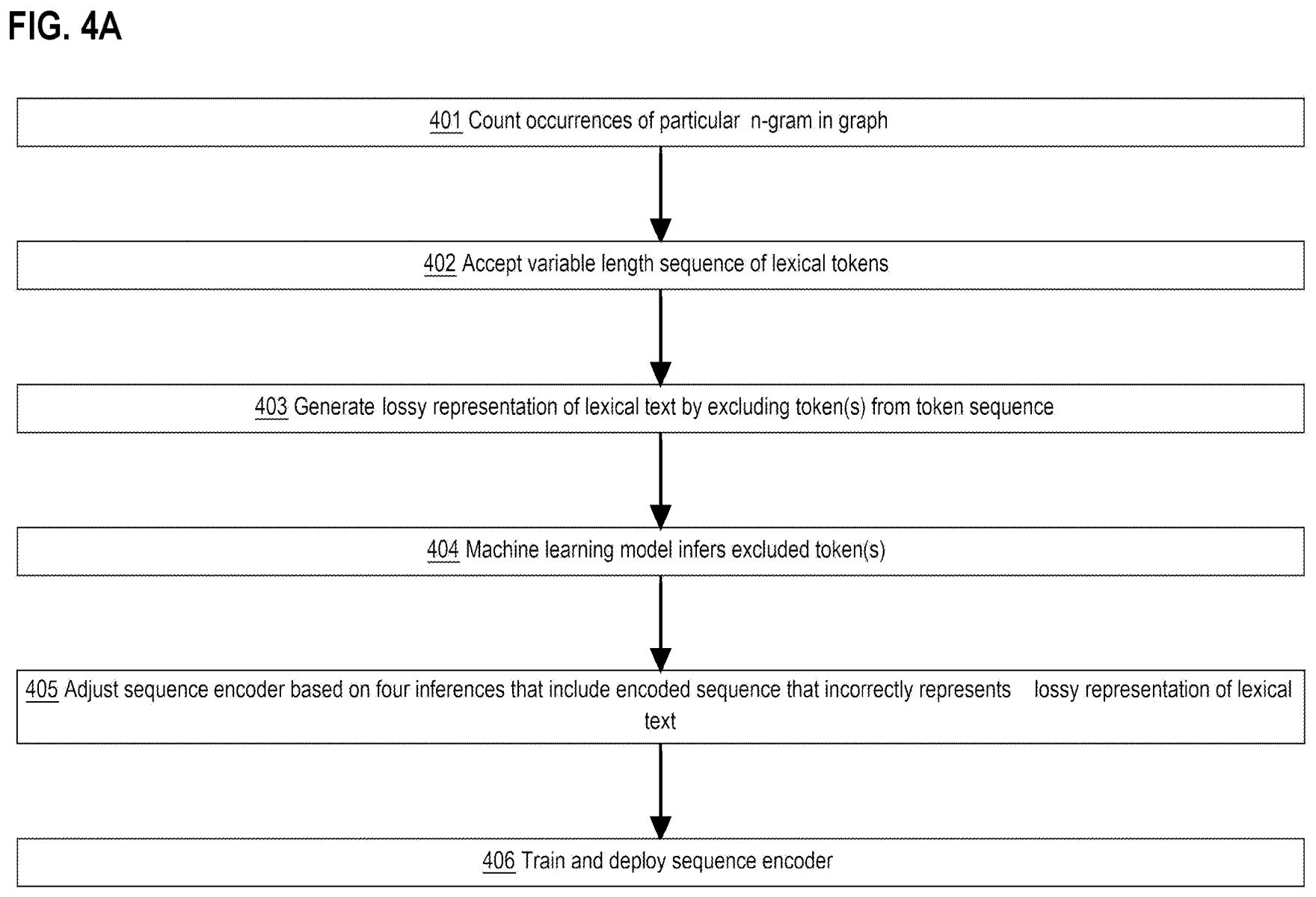

401 Count occurrences of particular n-gram in graph

402 Accept variable length sequence of lexical tokens

403 Generate lossy representation of lexical text by excluding token(s) from token sequence 404 Machine learning model infers excluded token(s)

405 Adjust sequence encoder based on four inferences that include encoded sequence that incorrectly represents lossy representation of lexical text 406 Train and deploy sequence encoder

FIG. 4B

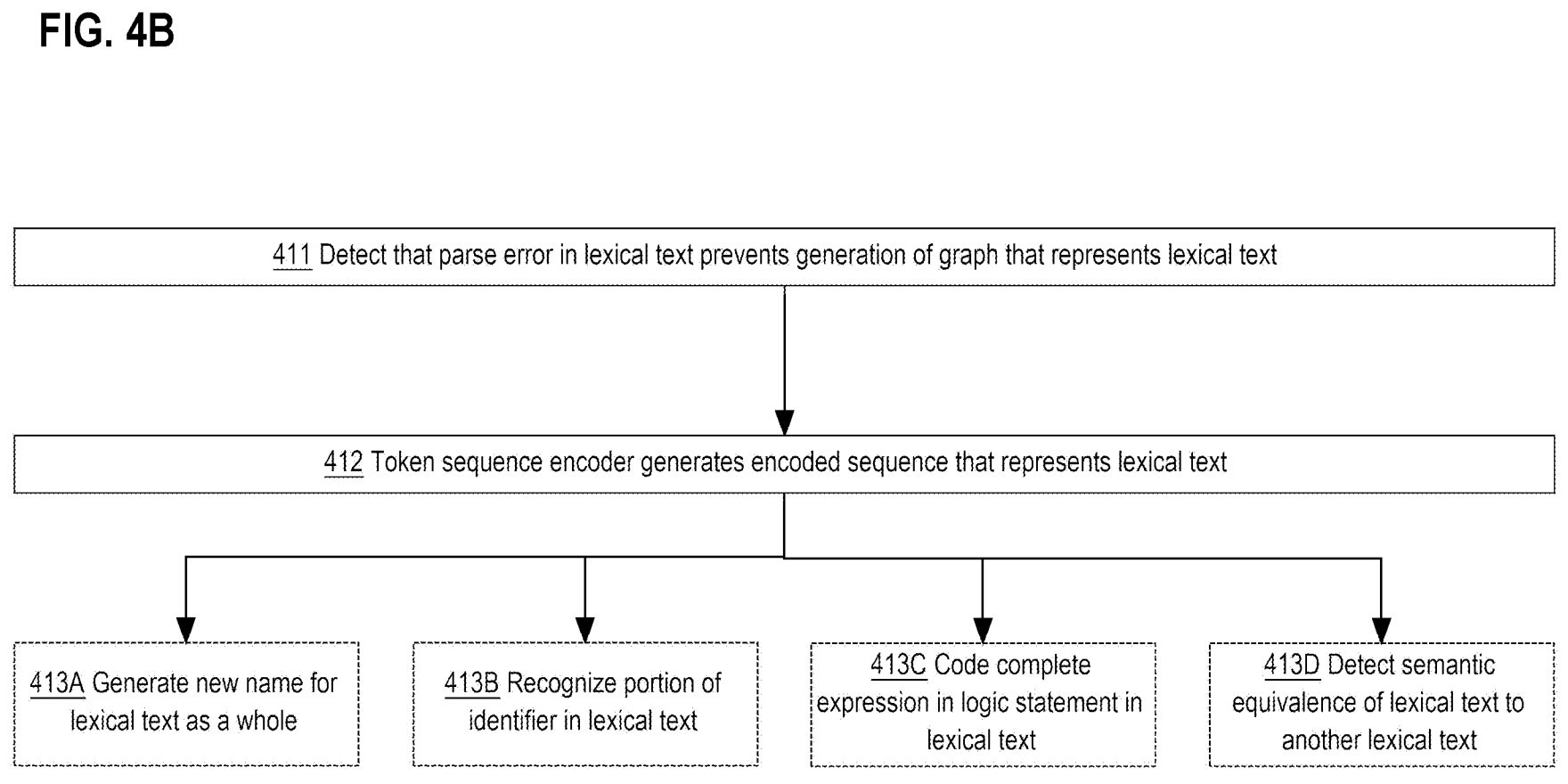

411 Detect that parse error in lexical text prevents generation of graph that represents lexical text 412 Token sequence encoder generates encoded sequence that represents lexical text 413A Generate new name for lexical text as a whole 413B Recognize portion of identifier in lexical text 413C Code complete expression in logic statement in lexical text 413D Detect semantic equivalence of lexical text to another lexical text

FIG. 6

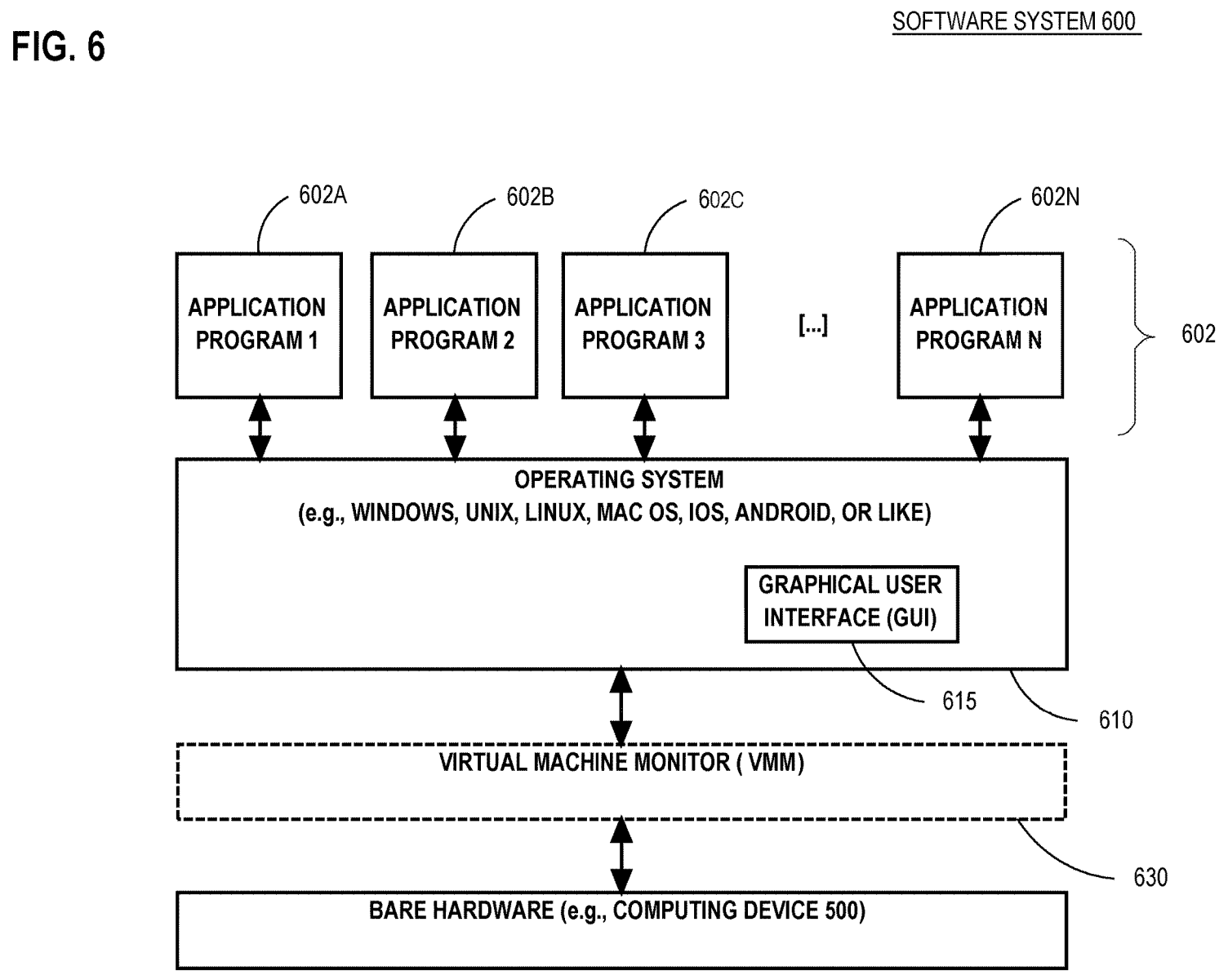

SOFTWARE SYSTEM 600

APPLICATION PROGRAM 1  602A

APPLICATION PROGRAM 2  602B

APPLICATION PROGRAM 3  602C

[...]

APPLICATION PROGRAM N  602N

602

OPERATING SYSTEM
(e.g., WINDOWS, UNIX, LINUX, MAC OS, IOS, ANDROID, OR LIKE)

GRAPHICAL USER INTERFACE (GUI)

610

615

VIRTUAL MACHINE MONITOR (VMM)  630

BARE HARDWARE (e.g., COMPUTING DEVICE 500)

GRAPH PATH PREDICTION AND MASKED LANGUAGE MODELLING JOINT TRAINING ALGORITHM FOR LANGUAGE MODELS

FIELD OF THE INVENTION

The present invention relates to natural language processing (NLP). Herein is machine learning pretraining to infer an encoded sequence from a lexical token sequence that represents a lexical text.

BACKGROUND

Language models built for natural language processing (NLP), such as bidirectional encoder representations from transformers (BERT), have been shown to perform well on a wide variety of languages. Natural languages may lack unambiguous formal structural patterns for syntax and grammar. However, a programming language may have parsing production rules and internal grammar that a natural language does not, and naively applying a natural language model to a programming language task may neglect the inherent and rigorously formal structure present in source code, potentially leading to suboptimal code representation.

Logical graphs are a tool frequently used to represent relationships between items. Examples of such graphs are an abstract syntax tree (AST) for static structure and a flow graph for dynamic interaction, which is not a tree, and a graph herein may or may not be a tree. These various graphs can capture syntactic and semantic information of source code by, for example, representing relationships between variables and statements. Generalized machine learning approaches, such as NLP with BERT but without graph analytics, may have accuracy decreased by an incomplete or missing representation of the various internal interrelationships within composite data.

A specialized machine learning approach may instead be painstakingly designed to expect a perfect (i.e. non-lossy) representation of a specialized graph only for a special application, and only graphs of a single, narrow knowledge domain with a special, discrete, and explicit representation whose handcrafted structural limitations are based on application specific or domain specific schematic presumptions such as cyclicity, edge directedness, vertex degree (i.e. edge count) based on vertex type, and subtree nesting based on vertex type. Such a specialized approach is not reusable beyond its narrow original application.

Thus, the state of the art is a tradeoff between accuracy and reuse, and any preference for accuracy would necessarily demand schematic presumptions that, although seemingly simplifications, may be much more prone to initial design errors and an extended development phase. Furthermore, any highly specialized state of the art approach cannot pretrain with text that contains a syntax error. Pretraining is an important technique provided herein and, without pretraining, finetuning would be impractical or wasteful, which is another important technique accommodated herein. Pretraining saves electricity and processor time because it can be done once but benefit many very different applications. Finetuning increases accuracy of a machine learning model and, thus, accuracy of the analytic computer itself that operates the machine learning model for a particular purpose. In those ways, pretraining with finetuning or pretraining without finetuning improves the performance of the computer(s) itself that hosts the machine learning model.

BRIEF DESCRIPTION OF THE DRAWINGS

In the drawings:

FIG. 2 is a flow diagram that depicts an example computer process to pretrain a sequence encoder to infer an encoded sequence from a lexical text;

FIG. 4A is a flow diagram that depicts an example computer process for multitask pretraining;

FIG. 4B is a flow diagram that depicts an example computer process that intelligently reacts to a parse error.

FIG. 6 is a block diagram that illustrates a basic software system that may be employed for controlling the operation of a computing system.

DETAILED DESCRIPTION

Figure 1:
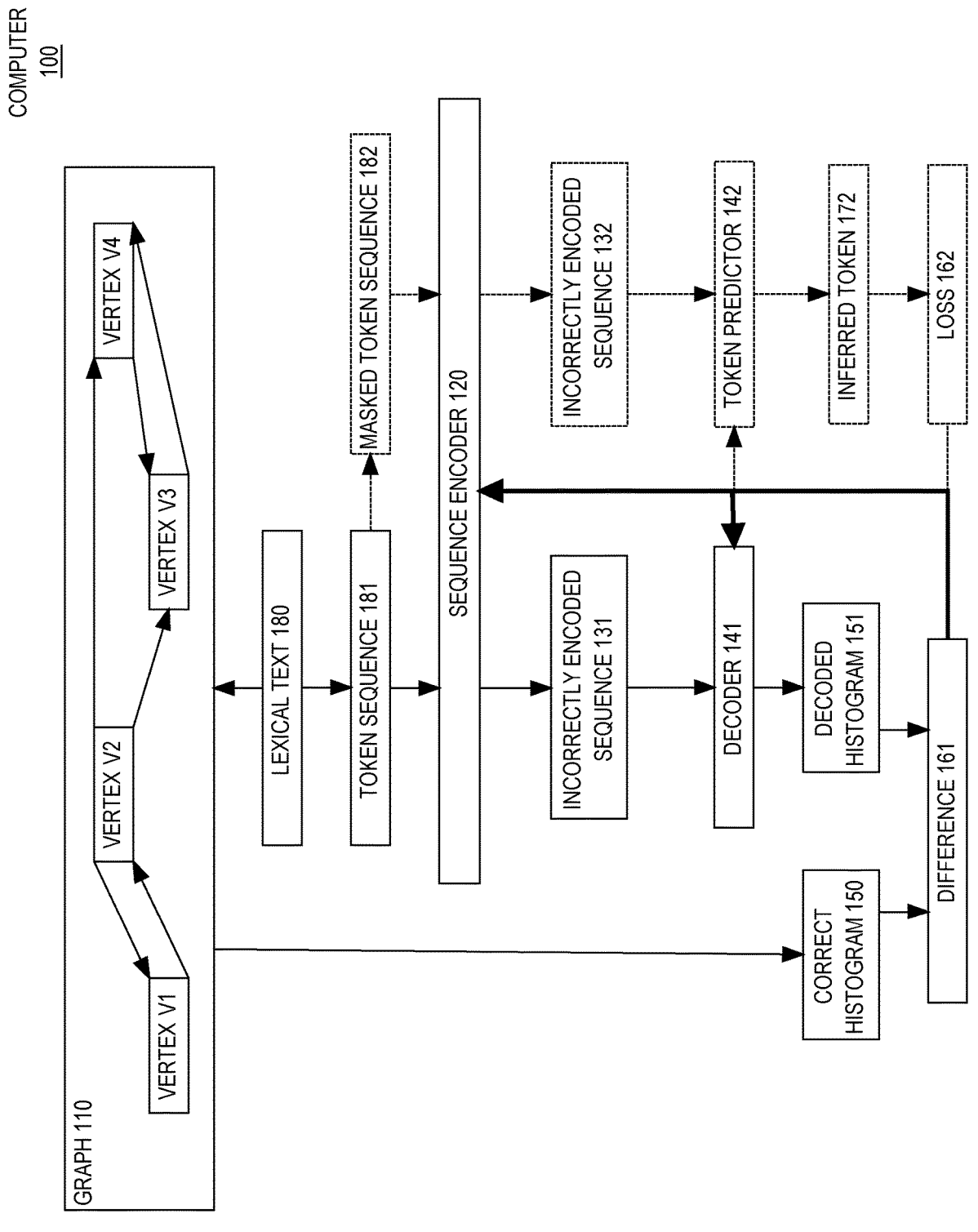
FIG. 1 is a block diagram that depicts an example computer that pretrains a sequence encoder to infer, based on natural language processing (NLP), an encoded sequence from a token sequence that represents a lexical text.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is graph embedding based on natural language processing (NLP) with machine learning pretraining to infer an encoded sequence from a lexical token sequence that represents any kind of lexical text herein such as source code logic. This is a robust and efficient approach that injects syntactic and semantic information of, for example, programing languages into a learning-based code representation model. Every source code statement or snippet may have an equivalent graph representation that effectively expresses the language's formal grammar and relationships between, for example, variables. Examples of such structures are an abstract syntax tree (AST) and a dataflow graph (DFG). State of the art representation models may explicitly use these rigid structures as direct input to provide syntactic and semantic information to the model, and this succumbs to several technical problems as discussed in the above Background.

In the approach herein is a pretraining framework called Graph Path Prediction (GPP) that injects code structure knowledge into a language model during training or pretraining, which removes the need to use rigid and explicit graph information as input during inference. To provide token-level knowledge to the model in some embodiments, a multitask learning paradigm may be based on a joint pretraining task composed of GPP and Masked Language Modelling (MLM) as discussed herein. A model trained in that way only needs as input a tokenized code snippet, reducing the computational cost, and the final representations are implicitly aligned with the inherent code structure. Thus, this special training is accelerated and is more accurate, and these improvements regard the performance of the computer(s) itself that hosts the language model.

GPP is a pretraining task that accepts as input a lexical token sequence that represents (e.g. complicated) lexical text and, for comparison, a parser may also provide a parse graph of the lexical text. For the token sequence, a representation is computed using a learning-based representation model that operates as a token sequence encoder. For the graph, a representation may instead be directly (i.e. without learning) computed using paths extracted from the graph. An important goal of GPP is to align the learned vector representation of the token sequence with the vector representation of the graph. For that purpose, structural information is injected, by learning such as backpropagation, into the sequence encoder only during training or pretraining to cause the sequence encoder to emit an encoding that additionally represents a graph's topology as accurately as possible in a very dense and fixed size format that does not depend on the (e.g. variable) size of: the lexical text, its token sequence, nor its graph.

To train inferencing of a graph's topology only from a lexical token sequence, an MLM training task may occur during multitask learning. In other words, after training or pretraining, the sequence encoder can apply some learned graph analytics to recognize a graph topology that is implied by a token sequence. The approach herein provides the following advantages.

After training and in a production environment, inference by the sequence encoder is accelerated because the sequence encoder does not have to ingest and process the actual graph itself that may require much more memory than a token sequence that represents the graph. This approach saves time and space of production inferencing.

Implicitly learning a mapping between a respective token sequence for any graph makes the model more general. This prevents overfitting, which increases accuracy in a production environment.

This technique is so flexible and robust that even a syntactically invalid lexical text that cannot produce a parse graph is valid input that achieves valid results. This makes the inferencing computer more reliable and facilitates valid graph encoding and downstream graph analytics with a live or streaming data feed.

The approach herein includes at least the following technical innovations. Graph Path Prediction with graph traversal paths is itself innovative because it exceeds detection of mere path presence by introducing path frequency to the graph encoding. That allows more frequent paths to have a higher value in the AST representation, which captures code structures that would have been ignored such as nested control flow loops. By normalizing the encoding as a probability distribution, each path is not analyzed independently and interactions between paths can be recognized.

Another innovation is pretraining the sequence encoder using a multitask strategy including GPP and MLM. Each task has a different decoder which maps the produced encodings back into a respective appropriate space that facilitates self-supervised co-learning of both training tasks. The decoders are trained simultaneously with the training of the sequence encoder and are responsible for injecting token-level knowledge by MLM and structural knowledge by GPP into the model. The graph encoding algorithm and pretraining herein are novel and, as discussed in the Background, important but rigid other approaches cannot pretrain. Pretraining provides more control over data provenance (and therefore the model bias introduced), and pretraining with GPP provides a better alignment between the learned code vector representation and a non-learned correct graph representation regardless of graph topology and graph complexity.

In an embodiment, a computer generates a histogram that correctly represents a graph that represents a lexical text, and generates a token sequence encoder that is trainable and untrained. During training such as pretraining, the token sequence encoder infers an encoded sequence that incorrectly represents the lexical text, and the encoded sequence is dense and saves space. To increase the accuracy of the sequence encoder by learning, the token sequence encoder is adjusted based on, as discussed herein, an indirectly measured numeric difference between the encoded sequence that incorrectly represents the lexical text and the histogram that correctly represents the graph.

1.0 Example Computer

FIG. 1 is a block diagram that depicts an example computer 100. Computer 100 pretrains sequence encoder 120 to infer, based on natural language processing (NLP), encoded sequence 131 from token sequence 181 that represents lexical text 180. Computer 100 may be one or more of a rack server such as a blade, a personal computer, a mainframe, or a virtual computer.

Stored in memory of computer 100 is lexical text 180 that is a character string that, during pretraining, is syntactically correct and accepted as valid input by a parser operated by computer 100 or previously by another computer. Parsing is discussed later herein, and a parser may generate graph 110 as a parse graph. Regardless of whether computer 100 has a parser or instead expects preexisting graphs, computer 100 may contain and operate a tokenizer, such as a lexer or scanner, that generates token sequence 181 from lexical text 180. In an embodiment, sequence encoder 120 contains its own tokenizer that can generate token sequence 181 from lexical text 180. Tokenization is discussed later herein. Herein, sequence encoder 120 may also be referred to as a token sequence encoder.

In an embodiment, lexical text 180 is one logic statement of a formal language. In an embodiment, the formal language is a declarative language such as domain specific language (DSL) such as structured query language (SQL), JavaScript object notation (JSON), or extensible markup language (XML). In an embodiment, the formal language is an imperative language such as a scripting language such as JavaScript or python or a general purpose programming language such as Java or C/C++.

In an embodiment, lexical text 180 is a lexical block that contains a sequence of logic statements, such as a for loop or a subroutine. In an embodiment, lexical text 180 is a logic script or a source file.

In an embodiment, pretraining of sequence encoder 120 uses a corpus that consists only of lexical texts, including lexical text 180. Pretraining is discussed later herein.

1.1 Example Graph and Graph Elements

Computer 100 may store or access graph 110 that may be a dataflow graph, a control flow graph, a property graph, or a logical tree such as: a) an abstract syntax tree (AST) that a parser may generate to represent one logic statement or a block (i.e. sequence) of logic statements or b) a document object model (DOM) such as of JSON or XML. Graph 110 contains many vertices V1-V4 interconnected by many edges such as shown.

In the shown embodiment, graph 110 is directed and its edges are directed according to the shown arrowheads on the edges. In an embodiment, graph 110 and its edges are undirected.

In the shown embodiment, graph 110 is cyclic. For example, vertices V1-V2 provide one cycle, and vertices V3-V4 provide another cycle. In an embodiment, graph 110 lacks cycles and is a directed acyclic graph (DAG) or an undirected logical tree. A tree has exactly one root vertex, many leaf vertices, and a sequence of tree levels that each contain many intermediate vertices.

In the shown embodiment, graph 110 is connected. In an embodiment, graph 110 contains disconnected subgraphs that have the same general structural constraints that graph 110 has as discussed above. For example, graph 110 may be a forest that contains many disconnected trees.

In an embodiment, graph 110 is stored in volatile or nonvolatile storage of computer 100. In an embodiment, the vertices and edges in graph 110 are stored as rows in tables such as vertex table(s) and edge table(s). In an embodiment, the vertices and edges in graph 110 are non-contiguously stored in a dynamically fragmented heap.

1.2 Example Probability Distribution

Herein, a histogram is a data structure that is formatted for accelerated analytics and compactness in storage. Herein, a histogram is not expressly designed for display, and display of a histogram is optional (e.g. unimplemented). In an embodiment, a histogram is a probability distribution as discussed later herein.

Histograms 150-151 may represent lexical text 180 and may be generated from lexical text 180 in distinct respective ways that, depending on the scenario, may cause histograms 150-151 to be identical, nearly identical, or at least somewhat similar. Histograms 150-151 each is a compressed representation of lexical text 180 and graph 110. A histogram is lossy because it contains only frequencies (e.g. counts or probabilities as discussed later herein) without identifying individual vertices or edges, and a histogram may be implemented as a numeric vector, which is a one-dimensional array of fixed size (i.e. bin count) and whose randomly-accessible elements are numbers (i.e. frequencies). Each array element is a distinct bin of the histogram. In an embodiment, each array element may be operated as an integer counter. Regardless of embodiment, histograms 150-151 have a same fixed count of bins.

Correct histogram 150 is a perfectly accurate histogram that contains empirically measured frequencies (e.g. counts) of artifacts that occur in graph 110. Although graph 110 consists of vertices and edges, the artifacts that occur in graph 110 may depend on the embodiment. Logical graph 110 contains two kinds of instance data, which are graph elements and graph artifacts. A graph element is a vertex or an edge. Interconnected graph elements provide the topology of graph 110. A graph element may have named properties (i.e. data fields). For example, graph 110 may be a property graph.

1.3 Example Graph Artifact

A graph artifact is any data structure that can be extracted more or less directly from graph 110's plurality of interconnected graph elements. For example, a graph artifact may be a subgraph of graph 110 or a graph traversal path that is an ordered sequence of vertices. Rules for identifying artifacts in graph 110 depend on the embodiment. For example, an embodiment may extract (e.g. directed and cyclic) paths of a uniform length (i.e. count of vertices).

A same graph element may occur in multiple artifacts. For example, graph 110 may contain path artifacts V1→V2→V4 and V2→V3→V4, and vertex V2 is a graph element that occurs in both artifacts. An artifact may contain repetitions (i.e. multiple occurrences) of a graph element. For example, cyclic path artifact V2→V1→V2 contains two occurrences of vertex V2.

In some embodiments, correct histogram 150 is not the only perfectly accurate histogram that can represent graph 110. Rules for generating correct histogram 150 from graph 110 may depend on the embodiment. In an embodiment, a fixed count of artifacts are randomly sampled from graph 110 and, due to randomness, repeated generation of a correct histogram from same graph 110 may result in somewhat different histograms, any of which may be used as correct histogram 150. In an embodiment, random sampling entails identifying path artifacts by random walking (e.g. from a tree root vertex or from a tree leaf vertex or from a randomly selected initial vertex).

1.4 Vertex Type Versus Artifact Class

Herein, a vertex has exactly one vertex type, and multiple vertices may be instances of a same vertex type. For example, green and red may be distinct vertex types or, if graph 110 is an abstract syntax tree (AST), native parse node types may be vertex types. For example, a structured query language (SQL) statement may contain an inner query and an outer query, which is two queries, and graph 110 may be an AST that has two SELECT parse nodes as two instances of the SELECT vertex type.

Herein, somewhat orthogonal to vertex type is artifact class. In a demonstrative embodiment, graph 110 is an unbalanced AST that has leaf vertices at different levels in the AST, and artifacts are one traversal path per tree leaf vertex, with all paths starting at the tree root vertex. In that case, the artifacts may be paths of different lengths (i.e. vertex counts) because the AST is unbalanced, and each distinct artifact length may be an artifact class. That is, path artifacts of length two may belong to one artifact class, and path artifacts of length three may belong to another artifact class.

In most embodiments, an artifact class is not a vertex type because an artifact is not a vertex. In some embodiments, each vertex is an artifact, and there is no distinction between vertex and artifact nor between vertex type and artifact class. Only in such an embodiment can vertex and artifact be conflated (i.e. treated as synonymous or interchangeable) and type and class can be conflated.

In an example embodiment that conflates vertices and artifacts, vertices V1-V3 may be colored green and vertex V4 may be colored red, and each individual vertex may be one distinct artifact. In that case, vertices V1-V3 are duplicates (i.e. occurrences of a same color that is both a vertex type and an artifact class). There are two distinct colors of vertices that are two artifact classes (i.e. green vertices and red vertices), and correct histogram 150 may have a distinct bin for each distinct color (i.e. artifact class) that might occur in graph 110. Correct histogram 150 may have one bin that records three as a count of green vertices V1-V3 and another bin that records one as a count of red vertex V4. Even though graph 110 only needs two color bins, correct histogram 150 may have additional bins for additional colors that could occur in other graphs but, incidentally, do not occur in this graph 110. In that case, the additional bins would record frequencies of zero for artifacts that do not occur in graph 110. Here, a color is a vertex type and an artifact class, and other embodiments may have other classes and types and other counts of classes and types. For example in an unshown embodiment, graph 110 may be an undirected abstract syntax tree (AST) composed of various types of parse tree nodes (i.e. vertices) and each distinct native parse node type may be a distinct vertex type.

1.5 N-Gram as Graph Traversal Path

In an embodiment, each vertex is treated as a gram, and each artifact is an n-gram that is a traversal path that contains a fixed count of grams (i.e. vertices along the path). In that case, both a path and an n-gram are synonymous and are an ordered sequence of vertices. A path may traverse an undirected edge in either direction, but a directed edge can be traversed only in the direction of the edge. For example, V1→V2, V2→V1, and V2→V3 are three distinct 2-grams that occur in graph 110, but V3→V2 does not occur in graph 110. By combinatorics, graph 110 may contain more n-grams than vertices or edges. For example, graph 110 contains four distinct vertices, six edges, and eight distinct 3-grams.

A path artifact may be a sequence of individual vertices as discussed above or, in some embodiments, may be a sequence of the vertex types of those vertices. If vertices V1-V3 are green vertices as discussed above, then n-grams may be sequences of colors (e.g. G for green and R for red) rather than sequences of distinct vertices. In that case, graph 110 contains fewer distinct 3-grams such as G→G→G and R→G→R. For example, V1→V2→V4 and V2→V3→V4 are both occurrences (i.e. duplicates) of G→G→R.

1.6 Corpus Vocabulary

In an embodiment, total frequencies of all artifacts (e.g. n-grams) in all graphs in a predefined corpus are measured, and these total frequencies are corpus-wide. In an embodiment, a corpus vocabulary is predefined to contain only distinct artifacts that have highest (e.g. top fifty) total frequencies. In that case, each of the fifty distinct artifacts in the corpus vocabulary has a distinct bin in correct histogram 150 that may have fifty bins. Regardless of how frequent is a distinct artifact in graph 110, if the artifact did not occur in the corpus or occurred too infrequently in the corpus: a) the corpus vocabulary does not contain the artifact, b) correct histogram 150 does not have a bin for the artifact, and c) occurrences of the artifact in graph 110 are ignored (i.e. not counted for frequency) when generating correct histogram 150.

Sequence encoder 120 learns to generate encoded sequences 131-132. Herein, encoded sequences 131-132 have a same fixed dimensionality (e.g. numeric array length), and the count of array elements may be more than or less than or the same as the fixed bin count of histograms 150-151. In other words, histograms and encoded sequences may both be numeric arrays, but there might be little or no direct correlation between array elements of the encoded sequence and array elements of the histogram. Indeed, decoder 141 learns to generate decoded histogram 151 from encoded sequence 131 as discussed later herein.

1.7 Sequence of Lexical Tokens

Sequence encoder 120 may be a language model that accepts token sequence 181 as variable-length (i.e. token count) input, which causes sequence encoder 120 to infer (i.e. generate) encoded sequence 131 that represents token sequence 181 that represents lexical text 180. Token sequence 181 is a sequence of lexical tokens. For example, sequence encoder 120 may be a language model such as bidirectional encoder representations from transformers (BERT) or FastText that are neural networks. Special ways to process token sequence 181 are discussed later herein.

Generation of token sequence 181 from lexical text 180 is as follows. For example, lexical text 180 may be a SQL statement that is text that can be split into lexical tokens to provide a sequence of tokens in the same ordering as the tokens originally occur in the statement's text. That is token sequence 181.

Generation of graph 110 as an AST may require parsing the SQL statement by a parser, whereas generation of token sequence 181 does not require parsing and can, for example, be performed by a lexer or scanner instead of a parser, or performed by sequence encoder 120 itself.

Unlike text tokenization, text parsing provides more contextual (i.e. structural) information. Parsing provides syntactic information, and text tokenization does not. For example, a relational table may have the same unqualified name as a column in the table. For a SQL statement that references the column by name and references the table by name (i.e. two references), a text tokenizer would generate an identical token for each of both references, which may be difficult to disambiguate. Whereas, a parser would instead generate a table reference parse node and a column reference parse node in the AST, which may be two different vertex types that convey more contextual/structural/syntactic information than two occurrences of a same text token.

In an embodiment, each literal (e.g. column name, number, or quoted string) in the SQL statement is represented by its own leaf node in the AST, and each SQL keyword or plurality of names (e.g. projected columns in a SELECT clause) or (e.g. filtration) compound expression is represented as an intermediate (i.e. non-leaf) node in the AST. Content of a leaf node may be circumstantial. For example, database queries may be automatically generated, based on textual templates or prepared statements, with some variables or placeholders for primary and foreign keys or for filtration constants such as literals. In other words, a client application may generate many queries that are structurally identical such that only the leaves of their parse trees differ, which is neither suspicious nor anomalous in the case of anomaly detection of a defective or malicious SQL statement.

In an embodiment, multiple or all leaf nodes in the AST have a same leaf vertex type. For example, there may be a number vertex type that numeric literal vertices may share regardless of their numeric values, or there may be a literal vertex type shared by literal leaf vertices regardless of literal datatype (e.g. number or quoted string). Alternatively, there may be one leaf vertex type that all leaf vertices share. In that case, only intermediate (i.e. keyword or non-literal) nodes contribute multiple distinct vertex types to the corpus vocabulary. Thus, two ASTs that differ only in circumstantial literals (i.e. leaf vertices) may have identical correct histograms 150 but would have distinct token sequences 181.

State of the art text tokenization for a language model such as BERT generates a separate token for each of many literals, and that text tokenization generates few or no tokens for many aspects of the SQL statement, and those aspects are structural or syntactic details that only a parser would detect. In other words, many or most of the lexical tokens in token sequence 181 are represented by leaf vertices in graph 110, and those tokens are mostly of a same one or few literal token types.

A technical problem is that most (e.g. non-keyword) intermediate vertices in an AST are syntactic (i.e. not lexical) and do not have a natural representation as a single lexical token. In an embodiment, a lexical token is generated using the name of the native (e.g. Java) implementation class of an intermediate tree node, and that Java class is a vertex type instead of an artifact class as discussed earlier herein.

As discussed earlier herein, an artifact class may be a distinct traversal path that is a sequence of multiple vertices or multiple vertex types. In that case as discussed earlier herein, an artifact may be an n-gram where each gram indicates the vertex type of a respective vertex along a traversal path in the AST of the SQL statement. In an embodiment, leaf vertices are ignored and n-grams are based only on intermediate vertices.

Sequence encoder 120 accepts as input a sequence of tokens in the ordering that the tokens actually occur. Intermediate vertices are unnatural (i.e. synthetic) and their ordering does not depend on an actual ordering of token sequence 181. For example, an ordering of grams of intermediate vertices in an n-gram may depend solely on tree traversal ordering, which is not reflected in the actual ordering of token sequence 181. Indeed, most or all of the intermediate vertices do not occur as individual tokens in token sequence 181.

1.8 Example Pretraining

In an embodiment, pretraining of machine learning models 120 and 141 occurs as follows. Herein, pretraining a model means that the model is initially entirely untrained, and both models 120 and 141 are initially untrained. Computer 100 performs pretraining, after which computer 100 or another computer may or may not perform finetuning, which is a way to specially retrain a generally pretrained model for adaptation to a specific application.

Sequence encoder 120 accepts token sequence 181 as input, which causes sequence encoder 120 to infer (i.e. generate) encoded sequence 131. During production inferencing, encoded sequence 131 would be sufficiently accurate, especially if sequence encoder 120 also was finetuned after pretraining. However during pretraining, incorrectly encoded sequence 131 is more or less inaccurate, and training inaccuracy is numerically measured as follows.

Herein, two histograms or two encoded sequences may be directly compared to numerically measure a difference. Numeric difference 161 is the measured difference between histograms 150-151.

1.9 Example Decoder

However, an encoded sequence cannot be directly compared to a histogram. Because a histogram and an encoded sequence may have respective numeric arrays of different sizes and/or may have little or no correlation between elements of their respective numeric arrays, there is no direct comparison of data structures 131 and 150 that measures how inaccurate is incorrectly encoded sequence 131. Instead, decoder 141 infers (i.e. generates) decoded histogram 151 from incorrectly encoded sequence 131, and then histograms 150-151 are compared to measure difference 161 that quantifies how inaccurate is incorrectly encoded sequence 131. Comparison and measurement techniques may be statistical, information theoretic, and/or entropic as discussed later herein.

Because both models 120 and 141 are initially untrained, it may be too difficult to ascribe different relative portions of the numeric magnitude of difference 161 to respective models 120 and 141. Thus, the same magnitude of difference 161 may be used as the measured error (i.e. loss) for both models 120 and 141, as shown by the thick multiheaded arrow from difference 161 to both of models 120 and 141. In other words, initially untrained models 120 and 141 co-learn during pretraining.

Pretraining of decoder 141 is one training task. For example, computer 100 may pretrain an artificial neural network that contains a sequence of neural layers that include a first subsequence of neural layers followed by a second subsequence of neural layers. Sequence encoder 120 may be implemented by the first subsequence of neural layers, and decoder 141 may be implemented by the second subsequence of neural layers. In that way, models 120 and 141 may be collocated neural networks inside a larger, combined neural network.

Regardless of whether none, one, or both of models 120 and 141 are neural, decoder 141 may be discarded after pretraining, and pretrained sequence encoder 120 may then be deployed without decoder 141 into finetuning or into production, and sequence encoder 120 may be nonlinear and perform nonlinear quantitative analytics. In an embodiment, decoder 141 is nonlinear. In an embodiment and regardless of whether or not decoder 141 is neural, decoder 141 may be linear and apply, for inference acceleration, arithmetically linear transformations to combinations of elements of the numeric array of incorrectly encoded sequence 131 to infer (i.e. generate) the numeric array of decoded histogram 151.

1.10 Example Multitask Pretraining

In a single-task embodiment, training of decoder 141 is the only training task. In a multitask pretraining embodiment, training of token predictor 142 is an additional training task that entails additional components 132, 142, 162, 172, and 182 that are shown with dashed borders to indicate that they are present only in the multitask embodiment. During pretraining, the additional training task prevents overfitting of sequence encoder 120 and increases accuracy of sequence encoder 120 by facilitating additional contextual learning as follows. After pretraining, token predictor 142 may be discarded.

In an embodiment, a pretraining neural network contains machine learning models 120 and 141-142 as neural subnetworks as discussed earlier herein. For example, the pretraining neural network may be a multibranch neural network where a first neural branch contains components 131, 141, and 151, and a second neural branch contains components 132, 142, 162, and 172. Which branch receives output from sequence encoder 120 depends on which token sequence 181 or 182 is currently accepted as input by sequence encoder 120. That is, acceptance of masked token sequence 182 by sequence encoder 120 causes generation of incorrectly encoded sequence 132.

Inferences 132 and 172 are generated in the second neural branch as follows. Discussed above is token sequence 181 that the first neural branch accepts as input. The second neural branch instead accepts masked token sequence 182 as input, which is generated from token sequence 181 as follows, and both token sequences 181-182 represent lexical text 180.

1.11 Example Masked Language Model (MLM) Pretraining

Masked token sequence 182 is an imperfect (i.e. lossy) copy of token sequence 181 because one or more tokens in masked token sequence 182 are masked. In masked token sequence 182, a masked token replaces an original token, and the masked token is a special token that should not occur in the predefined corpus nor in any token sequence 181. Because masked token sequence 182 only masks a very few tokens, incorrectly encoded sequences 131-132 may or may not differ for same lexical text 180.

Sequence encoder 120 infers incorrectly encoded sequence 132 from masked token sequence 182, and token predictor 142 accepts incorrectly encoded sequence 132 as input.

From incorrectly encoded sequence 132, token predictor 142 infers one or more inferred token(s) 172. Inferred token 172 is correct only if it occurs in token sequence 181 but not in masked token sequence 182 because inferred token 172 was replaced in masked token sequence 182 by a masked token. Loss 162 is a numeric measurement that is zero only if inferred token(s) 172 contains no token that was not masked and contains all tokens that were masked in masked token sequence 182. The magnitude of loss 162 measures how inaccurate is inferred token(s) 172.

Thus as discussed earlier herein, measurements 161-162 both measure error of a respective second inference from a respective encoded sequence that was generated as a respective first inference by sequence encoder 120. Measurements 161-162 may be arithmetically combined to generate a combined loss that can be (e.g. back) propagated to all three machine learning models 120 and 141-142 as shown, even if none, some, or all of machine learning models 120 and 141-142 are or are not neural. Thus during multitask (e.g. multibranch) pretraining, machine learning models 120 and 141-142 are initially untrained and are co-learning. In an embodiment, each of measurements 161-162 has an associated numeric weight that operates as a respective coefficient for multiplicative scaling the respective measurement before summing both measurements to generate a weighted combined loss. In that case, measurements 161-162 may have very different numeric ranges.

2.0 Example Pretraining Process

FIG. 2 is a flow diagram that depicts an example process that any computer herein may perform to pretrain sequence encoder 120 to infer encoded sequence 131 from logical graph 110. The process of FIG. 2 is generalized and adaptable for many more specific applications. An example process for a more specific application is instead presented in FIG. 4A as discussed later herein. The process of FIG. 2 entails single-task training. The process of FIG. 4A is a multitask extension of the process of FIG. 2.

Step 201 generates correct histogram 150 that correctly represents graph 110 as discussed earlier herein.

Step 202 generates sequence encoder 120 that is trainable and untrained. That is, step 202 instantiates sequence encoder 120 as an untrained machine learning model in memory of computer 100. Step 202 may configure hyperparameters of sequence encoder 120.

In step 203, sequence encoder 120 infers incorrectly encoded sequence 131 that incorrectly represents token sequence 181 as discussed earlier herein.

Step 204 generates decoded histogram 151 by decoding incorrectly encoded sequence 131 that incorrectly represents token sequence 181 as discussed earlier herein.

Based on decoded histogram 151, step 205 indirectly measures difference 161 that is a difference between incorrectly encoded sequence 131 and correct histogram 150. As discussed earlier herein an encoded sequence cannot be directly compared to a histogram. Thus, step 205 instead compares decoded histogram 151 to correct histogram 150 as discussed earlier herein.

Step 206 adjusts sequence encoder 120 based on difference 161 as discussed earlier herein. Step 206 achieves learning by propagating difference 161 to both machine learning models 120 and 141. If at least one of machine learning models 120 and 141 is neural, step 206 may perform neural backpropagation.

3.0 Example Natural Language Processing (NLP)

Figure 3:
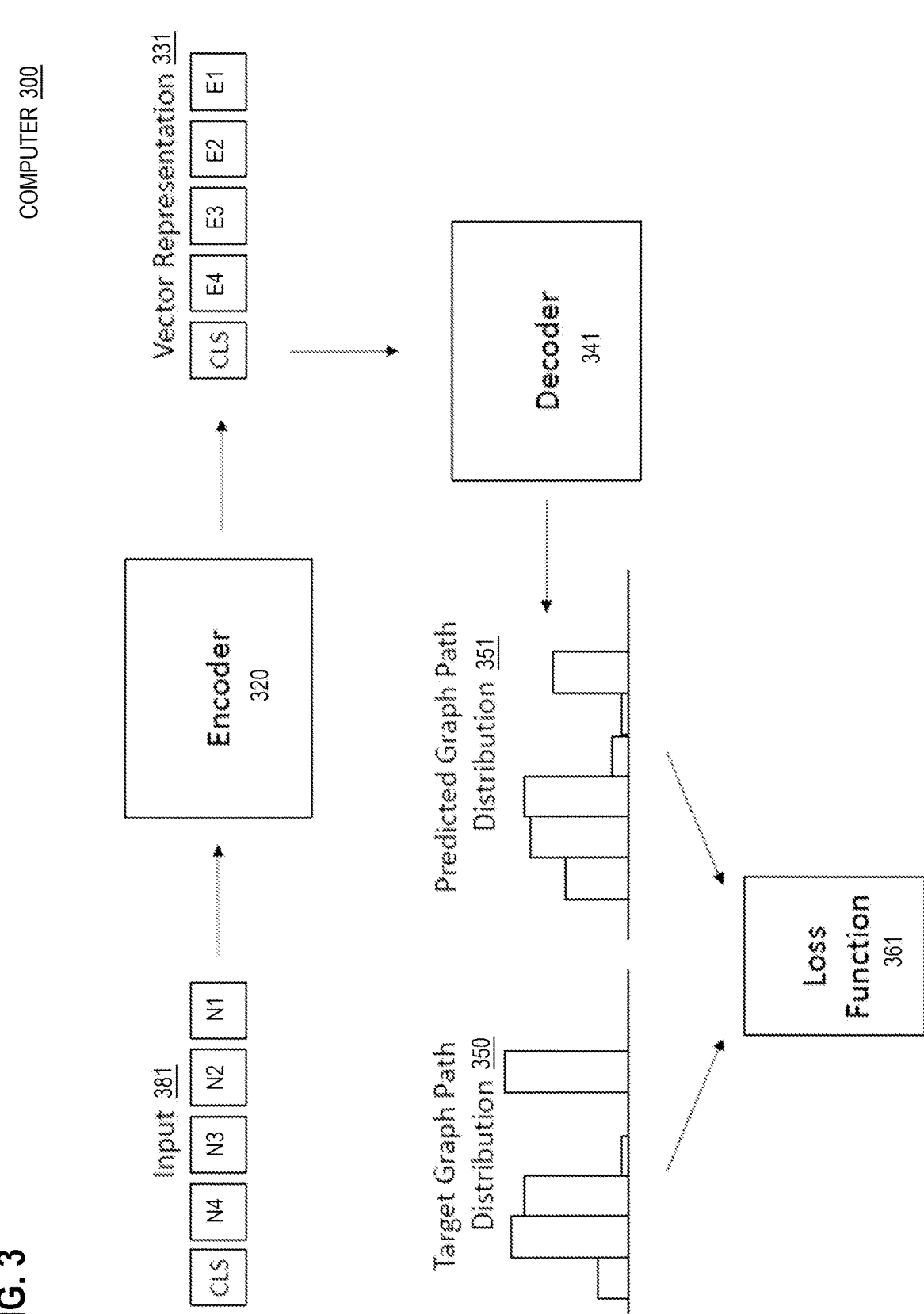
FIG. 3 is a block diagram that depicts an example computer that specially generates and processes an input sequence of lexical tokens that represent a lexical text.

FIG. 3 is a block diagram that depicts an example computer 300 that may be an embodiment of computer 100. Computer 300 specially generates and processes input 381 as follows.

Input 381 may be an embodiment of token sequence 181. Encoder 320 may be a bidirectional encoder representations from transformers (BERT) embodiment of sequence encoder 120. Vector representation 331 is used to generate incorrectly encoded sequence 131 as discussed below. Decoder 341 is a linear or nonlinear embodiment of decoder 141.

Target graph path distribution 350 is a probability distribution that may be an embodiment of correct histogram 150. Predicted graph path distribution 351 is a probability distribution that may be an embodiment of incorrectly encoded sequence 131. Loss function 361 generates an embodiment of difference 161.

Input 381 is a sequence of lexical tokens that represents lexical text 180 as discussed earlier herein. Encoder 320 accepts all tokens CLS and N1-N4 in input 381 together as a single input and generates a single inference. As shown, encoder 320 generates contextual token embedding E1 from token N1. Because encoder 320 is bidirectional, each of contextual token embeddings CLS and E1-E4 is based on all of tokens CLS and N1-N4. Token CLS is a synthetic token that is a special token (i.e. not occurring in the predefined corpus nor in lexical text 180) that causes generation of contextual token embedding CLS that causes generation of incorrectly encoded sequence 131 from vector representation 331 as follows.

In vector representation 331, each of contextual token embedding CLS and E1-E4 have a same size and format as incorrectly encoded sequence 131. Processing of inference CLS causes all preceding inferences E1-E4 to be arithmetically (e.g. summed or averaged) combined to generate incorrectly encoded sequence 131. Thus, incorrectly encoded sequence 131 represents vector representation 331 that represents input 381 that represents lexical text 180.

Decoder 341 accepts incorrectly encoded sequence 131 as input, which causes inferring (i.e. generation) of predicted graph path distribution 351 that is compared to target graph path distribution 350 by loss function 361 to generate difference 161 as discussed earlier and later herein.

4.0 Example Multitask Pretraining Process

FIG. 4A is a flow diagram that depicts an example process that any computer herein may perform for multitask (e.g. multibranch) pretraining. The process of FIG. 4A may be an embodiment of the process of FIG. 2. The steps of FIGS. 2 and 4 are compatible and may be combined or interleaved. For demonstration, FIG. 4A is discussed with reference to computers 100 and 300 that may provide example natural language processing (NLP) mechanisms, and the process of FIG. 4A is also compatible with computers other than computer 300 that have same or other NLP mechanisms.

Step 401 counts occurrences of a particular n-gram in graph 110 and records the count in target graph path distribution 350 as discussed earlier herein for correct histogram 150.

In step 402, encoder 320 accepts input 381 that is a variable length sequence of lexical tokens as discussed earlier herein.

Step 403 generates a lossy representation of lexical text 180 by excluding token(s) from token sequence 181. In an embodiment, masked token sequence 182 is the lossy representation that step 403 generates as discussed earlier herein.

In step 404, token predictor 142 (e.g. incorrectly) infers excluded token(s) that are inferred token(s) 172 as discussed earlier herein.

Step 405 may generate and combine measurements 161-162 into a combined loss as discussed earlier herein. In an embodiment, step 405 invokes loss function 361 as discussed earlier herein. Step 405 adjusts encoder 320 based on a combined loss that is based on two training tasks and based on four inferences that are encoded sequences 131-132, decoded histogram 151, and inferred token 172 as discussed earlier herein.

Steps 401-405 perform pretraining. Herein, training may be pretraining, finetuning, or both. Step 406 trains and deploys encoder 320 into a production environment. If training by step 406 is pretraining, then step 406 includes pretraining steps 401-405 as sub-steps. If training by step 406 is finetuning (i.e. retraining), then step 406 may occur on different computer(s) than pretraining steps 401-405, and those different computers may be owned by different parties.

5.0 Example Fault Tolerant Process

Although a production application that contains an already trained token sequence encoder 120 may lack a parser and may lack graph 110, the following is an example embodiment of a production application that, for any purpose, uses graph 110 that is a parse graph.

FIG. 4B is a flow diagram that depicts an example process that any computer herein may perform to intelligently react to a parse error. The steps of FIGS. 2 and 4A-B are compatible and may be combined or interleaved. FIG. 4B is discussed with reference to FIG. 1.

The process of FIG. 4B may operate in a production environment that is a headless environment such as an automation pipeline or is an interactive environment such as an integrated development environment (IDE). Lexical text 180 may be new (e.g. not in any training corpus).

Step 411 detects that a parse error in lexical text 180 prevents generation of graph 110 that would represent lexical text 180. For example in step 411, a parser may fail due to a syntax error in lexical text 180, which may be more or less catastrophic in the state of the art. Although detectable herein, a parse error is tolerated and has no impact on the production operation of sequence encoder 120.

In step 412, sequence encoder 120 generates a more or less correctly encoded sequence that represents lexical text 180 even though parsing of lexical text 180 failed.

Alternative steps 413A-413D are shown with dashed outlines to indicate that steps 413A-413D are mutually-exclusive application-specific learned behaviors that based on a respective inference by an application-specific machine learning model that is in addition to sequence encoder 120. In any embodiment, exactly one of steps 413A-413D is implemented, and whichever step is implemented entails the additional model inferring from the encoded sequence that represents lexical text 180. Alternative steps 413A-413D are facilitated by the encoded sequence, which represents syntax and semantics of lexical text 180. Steps 413A-413D are non-limiting examples of how to apply already trained sequence encoder 120 for production use.

Step 413A generates a new name for lexical text 180 as a whole. In this embodiment, lexical text 180 defines a subroutine, a data structure or class, or a script. For example, step 413A generatively proposes a new name for a (e.g. unnamed) subroutine based on the logic in the subroutine as reflected in the encoded sequence that represents lexical text 180.

Step 413B recognizes a portion of an identifier in lexical text 180. For example when searching for any subroutine that provides summation, step 413B may detect that the encoded sequence that represents lexical text 180 that declares a subroutine named sumCosts.

Step 413C performs code completion of an expression in a logic statement in lexical text 180 in, for example, an IDE. For example, masked language modeling or skip grams may be used to train a code generator such as a code completer. Code completion may entail generating code to, for example, remedy the parse error.

Step 413D detects that two logical texts are somewhat similar due to some semantic equivalence of, for example, lexical text 180 to another lexical text. For example, lexical text 180 may be new and interactively edited and fail to parse, and the other lexical text may be a good example of similar logic that already parsed, which may facilitate a side by side comparison, for example.

6.0 Exemplary Embodiment

The following is an exemplary embodiment referred to herein as graph path prediction (GPP). GPP may be implemented by any computer herein. GPP is composed of two phases. The first phase entails graph encoding, and the second phase achieves alignment between non-learned encoding and learned graph encoding.

6.1 Example First Phase

In the first phase, the graph is represented as a collection of paths, and each path may be a graph artifact as discussed earlier herein. For that, a path extraction strategy such as depth-first traversal, breadth-first traversal, or random walk is selected to retrieve a collection of S paths. Then, using a previously computed corpus vocabulary as discussed earlier herein, the extracted paths are one-hot encoded. From each artifact may be generated a respective one-hot encoding (not shown) that consists of a numeric array that has the same size (i.e. element count) as the numeric array of target graph path distribution 350, and that size also is the bin count of target graph path distribution 350 as determined by the corpus vocabulary as discussed earlier herein.

Each one-hot encoding contains only zeros as elements, except for a number one that occurs in the numeric array of the one-hot encoding at an array offset that indicates which exactly one artifact (i.e. n-gram) of the corpus vocabulary is the extracted path. Once all paths have been one-hot encoded, the result is a collection of unit vectors $\{e_1, \ldots, e_S\}$ where $e_i$ corresponds to the one-hot encoding of path i. This collection of unit vectors is not a proper set because the paths are not necessarily unique. Target graph path distribution 350 is obtained by averaging these vectors together according to the following example averaging formula.

$$\frac{1}{S}\sum_{i=1}^{S} e_i$$

The following terms have the following meanings in the above averaging formula.

S is a count of artifacts (e.g. paths) extracted from graph 110.

i is an index integer.

$e_i$ is the i-th unit vector that is a one-hot encoding.

The above averaging formula generates a normalized frequency count of all extracted paths. Normalization provides a probability distribution as discussed later herein.

For graph encoding, GPP may implement the following Algorithm 1 that has the following steps 1-4 that cooperate to generate target graph path distribution 350 as follows.

1: Input: Code snippet C, parser P, path length N, path selection strategy S, path one-hot encoding dictionary D 2: Use parser P to produce the graph.

3: Following strategy S, extract paths of length N from the graph.

4: Graph Vector Representation s: Use dictionary D to one-hot encode all paths, and compute their normalized sum.

The following terms have the following meanings in Algorithm 1.

Code snippet C may be text that is source logic of a formal language such as SQL, python, Java, JavaScript, or C/C++. For example, snippet C may contain one logic statement or contain a lexical block that contains a sequence of statements. For example, snippet C may be a partial or entire python script.

Parser P generates an AST that represents snippet C.

Path length N is a configurable uniform path length, which is the 'n' for the n-grams.

Path selection strategy S is a configurable heuristic for extracting artifacts such as n-grams, such as by a particular tree traversal algorithm as discussed earlier herein.

Path one-hot encoding dictionary D contains one-hot encodings of the corpus vocabulary of most frequent n-grams in the corpus.

Graph Vector Representation s is target graph path distribution 350 that is the result of the above averaging formula.

6.2 Example Second Phase

The second phase learns to align the encoding of the input, produced by encoder 320, with the representation of the graph. For that, let $x=\{\langle CLS \rangle, x_1, \ldots, x_M\}$ be input 381, and $\Phi(\bullet; \Theta)$ be encoder 320, where $\langle CLS \rangle$ is a special token and $\Theta$ is the set of learnable model parameters (e.g. neural connection weights). A contextual vector of each token is generated according to the following example encoding formula.

$$\Phi(x;\Theta)$$

For the global input representation, only the contextual vector $v \in Rd$ of the $\langle CLS \rangle$ token is used, where d is encoder 320's embedding dimension as discussed earlier herein. The global representation vector is then decoded (i.e. mapped back into the graph space that already contains target graph path distribution 350. That entails decoder 141 that maps v from $R_d$ to $R_N$, where N is the number of unique paths in the dictionary. The output v' of decoder 141 is normalized into a probability distribution that is predicted graph path distribution 351 according to the following example normalization formula that generates w that is predicted graph path distribution 351. When generated by softmax, each bin of predicted graph path distribution 351 contains a probability that ranges from zero to one, in which case target graph path distribution 350 also should be normalized to contain values that are probabilities that range from zero to one.

$$w=\text{softmax}(v')$$

Loss function 361 may be a Multi-label Cross-Entropy Loss function such as the following example cross-entropy function.

$$-\sum_{i=1}^{N} \log(w_i)s_i$$

The loss measured by the example cross-entropy function can, in a single-task neural embodiment as discussed earlier herein, be backpropagated, and all neural connection weights are updated.

The following example Algorithm 2 and its example steps 1-5 may be an implementation of GPP-based pretraining that is based on the above discussed mechanisms of the exemplary embodiment.

1: Input: Code snippet C, graph vector representation s, tokenizer T, encoder model $\Phi$, decoder model $\Gamma$ 2: Use tokenizer T to split the code and map each token to a vector.

3: Code contextual vector representation V: Use encoder model $\Phi$ to compute the tokens' contextual vector representation.

4: Predicted Graph Representation w: Extract $\langle CLS \rangle$ representation, and use the decoder model $\Gamma$ followed by a softmax operator to get the predicted graph representation.

5: Use Multi-Label Cross-Entropy to compute the loss using the target s and the predicted w graph representations, and update the weights of $\Phi$ and $\Gamma$ using backpropagation.

In example Algorithm 2, decoder model $\Gamma$ may be decoder 141, and other terms may have meanings as discussed above for Algorithm 1.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
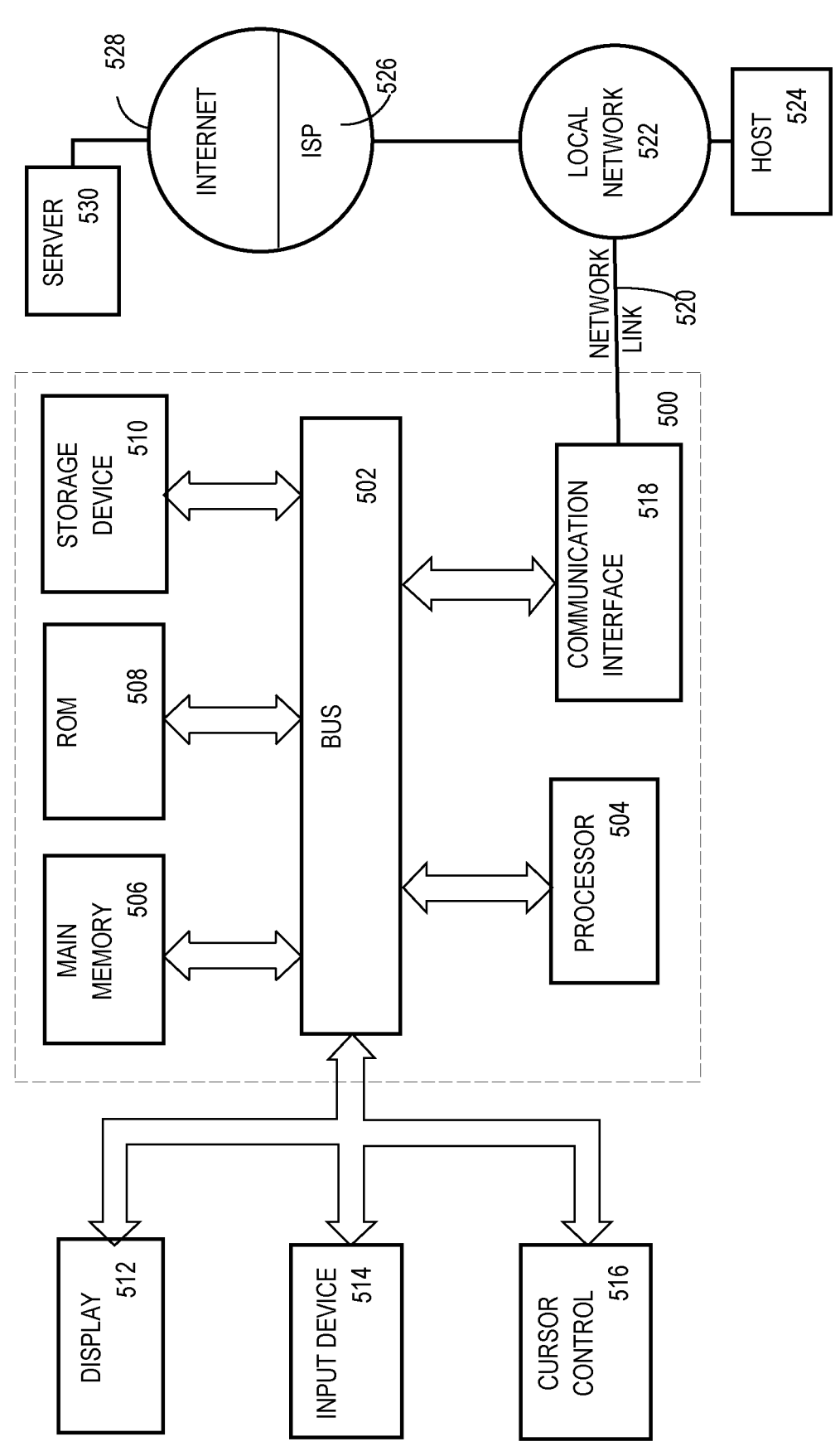
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory

506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons.

A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer $L-1$ to a layer $L$. Given the number of neurons in layer $L-1$ and $L$ is $N[L-1]$ and $N[L]$, respectively, the dimensions of matrix W is $N[L-1]$ columns and $N[L]$ rows.

Biases for a particular layer L may also be stored in matrix B having one column with $N[L]$ rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
training a token sequence encoder that is untrained by:
    a) generating a histogram that correctly represents a graph that represents a lexical text;
    b) inferring from the lexical text, by the token sequence encoder, an encoded sequence that incorrectly represents the lexical text;
    c) generating a decoded histogram by decoding the encoded sequence that incorrectly represents the lexical text;
    d) measuring a difference between the decoded histogram and the histogram that correctly represents the graph; and
    e) adjusting the token sequence encoder based on said difference between said histograms; and
inferring from a second lexical text, by the token sequence encoder, a second encoded sequence that correctly represents the second lexical text;
wherein the method is performed by one or more computers.

2. The method of claim 1 wherein:
said decoding the encoded sequence that incorrectly represents the lexical text is performed by a linear decoder;
the token sequence encoder is nonlinear.

3. The method of claim 1 wherein:
the method further comprises multitask learning by the token sequence encoder;
said inferring the encoded sequence that incorrectly represents the lexical text and said adjusting the token sequence encoder occur during said multitask learning by the token sequence encoder.

4. The method of claim 1 wherein:
the method further comprises:
    generating a lossy representation of the lexical text, and
    inferring, by the token sequence encoder, an encoded sequence that incorrectly represents the lossy representation of the lexical text;
said adjusting the token sequence encoder is further based on the encoded sequence that incorrectly represents the lossy representation of the lexical text.

5. The method of claim 4 wherein:
said generating the lossy representation of the lexical text comprises excluding at least one token from a token sequence that represents the lexical text;
the method further comprises inferring, by a machine learning model, the at least one token;
said adjusting based on the encoded sequence that incorrectly represents the lossy representation of the lexical text is based on said inferring the at least one token.

6. The method of claim 1 wherein said generating the histogram that correctly represents the graph comprises counting occurrences of a particular n-gram in the graph.

7. The method of claim 1 wherein the graph is at least one selected from a group consisting of a directed graph and a dataflow graph.

8. The method of claim 1 wherein:
the encoded sequence that incorrectly represents the lexical text has a fixed size;
said inferring the encoded sequence that incorrectly represents the lexical text comprises accepting a variable length sequence of lexical tokens.

9. The method of claim 8 wherein each lexical token in the variable length sequence of lexical tokens represents multiple vertices.

10. A method comprising:
detecting that a parse error in a lexical text prevents generation of a graph that represents the lexical text;
generating, by a token sequence encoder, a fixed-size encoded sequence that represents the lexical text; and
inferring, from the fixed-size encoded sequence that represents the lexical text, a code completion of an expression in a logic statement in the lexical text;
wherein the method is performed by an integrated development environment (IDE).

11. One or more non-transitory computer-readable media storing instructions that, when executed by one or more processors, cause:
training a token sequence encoder that is untrained by:
    a) generating a histogram that correctly represents a graph that represents a lexical text;
    b) inferring from the lexical text, by the token sequence encoder, an encoded sequence that incorrectly represents the lexical text;
    c) generating a decoded histogram by decoding the encoded sequence that incorrectly represents the lexical text;

d) measuring a difference between the decoded histogram and the histogram that correctly represents the graph; and e) adjusting the token sequence encoder based on said difference between said histograms; and inferring from a second lexical text, by the token sequence encoder, a second encoded sequence that correctly represents the second lexical text.

12. The one or more non-transitory computer-readable media of claim 11 wherein:

said decoding the encoded sequence that incorrectly represents the lexical text is performed by a linear decoder;

the token sequence encoder is nonlinear.

13. The one or more non-transitory computer-readable media of claim 11 wherein:

the instructions further cause multitask learning by the token sequence encoder;

said inferring the encoded sequence that incorrectly represents the lexical text and said adjusting the token sequence encoder occur during said multitask learning by the token sequence encoder.

14. The one or more non-transitory computer-readable media of claim 11 wherein:

the instructions further cause:

generating a lossy representation of the lexical text, and inferring, by the token sequence encoder, an encoded sequence that incorrectly represents the lossy representation of the lexical text;

said adjusting the token sequence encoder is further based on the encoded sequence that incorrectly represents the lossy representation of the lexical text.

15. The one or more non-transitory computer-readable media of claim 14 wherein:

said generating the lossy representation of the lexical text comprises excluding at least one token from a token sequence that represents the lexical text;

the instructions further cause inferring, by a machine learning model, the at least one token;

said adjusting based on the encoded sequence that incorrectly represents the lossy representation of the lexical text is based on said inferring the at least one token.

16. The one or more non-transitory computer-readable media of claim 11 wherein said generating the histogram that correctly represents the graph comprises counting occurrences of a particular n-gram in the graph.

17. The one or more non-transitory computer-readable media of claim 11 wherein the instructions further cause:

after said training the token sequence encoder, receiving a second graph that is a portion of a third graph by incompletely receiving a data stream that consists of the third graph, and inferring, by the token sequence encoder and without completely receiving the third graph, an encoded sequence that represents the second graph.

18. One or more non-transitory computer-readable media storing instructions that, when executed by an integrated development environment (IDE), cause:

detecting that a parse error in a lexical text prevents generation of a graph that represents the lexical text;

generating, by a token sequence encoder, a fixed-size encoded sequence that represents the lexical text; and inferring, from the fixed-size encoded sequence that represents the lexical text, a code completion of an expression in a logic statement in the lexical text.

\* \* \* \* \*